US008044797B2

(12) United States Patent
Brommer et al.

(10) Patent No.: US 8,044,797 B2
(45) Date of Patent: Oct. 25, 2011

(54) SYSTEM FOR LOCATING ITEMS

(75) Inventors: Karl D. Brommer, Exeter, NH (US); Court E. Rossman, Merrimack, NH (US); Cedric L. Logan, Nashua, NH (US); Paul E. Gili, Mason, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 451 days.

(21) Appl. No.: 12/360,322

(22) Filed: Jan. 27, 2009

(65) Prior Publication Data

US 2010/0188211 A1 Jul. 29, 2010

(51) Int. Cl.
*G08B 1/08* (2006.01)

(52) U.S. Cl. ................. 340/539.32; 340/539.1; 340/531

(58) Field of Classification Search .............. 340/539.32
See application file for complete search history.

(56) References Cited

U.S. PATENT DOCUMENTS

| | | | | |
|---|---|---|---|---|
| 2005/0088302 | A1* | 4/2005 | Pucci et al. | 340/568.1 |
| 2005/0212672 | A1* | 9/2005 | Fry | 340/539.13 |
| 2006/0170546 | A1* | 8/2006 | Clifford | 340/539.32 |
| 2007/0279220 | A1* | 12/2007 | Wilcox | 340/539.32 |
| 2008/0004904 | A1 | 1/2008 | Tran | |
| 2008/0018475 | A1* | 1/2008 | Breed et al. | 340/572.7 |
| 2008/0030325 | A1* | 2/2008 | Fries | 340/539.32 |
| 2008/0207357 | A1* | 8/2008 | Savarese et al. | 473/407 |
| 2008/0231431 | A1 | 9/2008 | Stawar et al. | |
| 2008/0297323 | A1* | 12/2008 | Barkan | 340/10.31 |
| 2009/0045958 | A1* | 2/2009 | Spano | 340/572.2 |
| 2009/0295570 | A1* | 12/2009 | Simon et al. | 340/539.32 |

FOREIGN PATENT DOCUMENTS

WO WO 2005083885 A1 * 9/2005

* cited by examiner

*Primary Examiner* — George Bugg
*Assistant Examiner* — Kerri McNally
(74) *Attorney, Agent, or Firm* — Daniel J. Long; Robert K. Tendler

(57) ABSTRACT

A convenient handheld locator is provided for locating an item in an urban environment in which the locator is programmed to search for and locate specific items, with the detected item being displayed on the locator as to its identity or name, also displaying where the item is relative to the locator, as to position and range.

8 Claims, 11 Drawing Sheets

SYSTEM FOR LOCATING ITEMS

FIELD OF INVENTION

This invention relates to a method and apparatus for locating misplaced items utilizing RFID technology, more particularly to a handheld locator device that projects energy in a narrow beam and receives energy returned from an illuminated and previously encoded RFID device in which the identity of the detected item is displayed along with its direction and distance from the handheld device, all based on a previous synchronization operation of the locator with a computer-generated item listing.

BACKGROUND OF THE INVENTION

Oftentimes it is useful for anyone who lives in a house, apartment, tent, or other environment or who works in an office, school, warehouse, factory, farm, zoo, underground mine or other enclosed space to find misplaced items. One might want to find books, keys, tools, papers, various equipment, magazines or anything else that can be lost in a building or crowded area.

As will be apparent, tools can fall from a workbench. Books can be mislaid on a couch behind pillows or in another room. Items such as remote clickers, eyeglasses, and even such items as small as a screw or bolt can oftentimes get lost and a great deal of time is spent trying to locate these items.

In the past, EPC-standard RFID tags have been used to identify items, with the RFID tags encoded with appropriate identification information such as a barcode. Additionally, golf balls can be found by a so-called Radar Golf Ball Finder, with the technology used described in United States Patent Application Publication Number U.S. 2006/0128503. In this Patent Publication a golf ball locator receives RF signals back from an RF circuit within the golf ball. The range to the golf ball is determined by the received signal strength using a received signal strength indicator, or RSSI, with a threshold being set to indicate golf ball detection. In one embodiment of the golf ball locator, the carrier from the locator is modulated to provide a spread spectrum binary phase shift keyed, BPSK, modulated signal, where the modulation includes a pseudorandom binary sequence, also known as a pseudo noise or PN code. Transmitted pulses are used to locate the golf ball which has an RF circuit that returns a harmonic of the transmitted signal back to the locator.

Additionally, RFID tags have been utilized to locate animals in which an RFID tag is attached to the animal.

One problem with all of the above RFID applications is that they operate out in the open. There are no multi-path or standing wave problems in which signals bounce off metal in the urban environment and building structures which makes indoor reading of RFID tags difficult. These applications are quite different from RFID readers which are adjacent tagged articles and which operate at low power.

The problem with EPC-standard RFID tags is that they are intentionally limited in range due to limits on the transmit power established by the Federal Communications Commission. What typically happens with an RFID tag is that energy from a source is used to power the tag, with the tag then re-radiating its code back to the source, whereby the tag is identified. The Federal Communications Commission intentionally limits the amount of power that can be utilized to power these tags so that the tag must be relatively close to the interrogating head in order for the RFID tag to work.

With respect to radar golf, the radar golf system discussed above does not distinguish which golf ball is detected and is range-limited to approximately 100 feet. As to animal tags, the tags have batteries and are difficult to reconfigure.

SUMMARY OF THE INVENTION

The subject invention involves a convenient handheld locator for locating an item in an urban environment in which the locator is programmed to search for and locate specific items. This provides a convenient method and apparatus for locating a specified item, with the detected item being displayed on the locator as to its identity or name. Also, where the item is relative to the locator is displayed, both as to position and range.

The subject locator is useable indoors and out, and in one embodiment uses a long range batteryless tag with a variable power directional interrogator or locator similar to a flashlight. Software is provided to make the locator work inside where signals bounce off metal in walls and furniture. Moreover, range is increased by transmitting the unique code to which the tag responds which significantly increases the signal-to-noise ratio and thus increases range and the robustness of the system.

It is a feature of the subject invention that the locator is provided with a software interface such that items tagged with individual coding devices such as surface acoustic wave devices may be identified by the returned radiation from the tag, with the item being identified on-screen by its name. The locator ascertains by the returned signal which item has been found, and upon detection its identity is displayed by a simple word such as "magazine". The identity of the tag is previously uploaded to the locator from an item list in a computer. Thus, items can be prelabeled such as for instance "eyeglasses" or "book", with the locator having a display that displays the name associated with the tag code for the item detected. In one embodiment this association is provided through a USB or wireless link in a hot-synching operation.

The tags can be placed on books, personal articles such as passports, wallets, phones and keys, tools, magazines, pets, equipment, clothing or anything likely to be misplaced or lost. In one embodiment, the locator operates as a reader that works like a flashlight. It is directional so that one can point it in different directions and find lost articles when they are detected. A ranging algorithm estimates how close the reader is to the lost article and in another embodiment the output power of the transmitter can be varied so that one can for instance choose an ISM band where increased power is permissible.

The tags on the other hand are simple, batteryless and therefore inexpensive. The tags can be attached to various articles, with many form factors possible. One form factor resembles adhesive tape or the Dymo plastic embossed tape that was prevalent in the 1970's.

In one embodiment, each tape tag contains a dipole antenna and a circuit utilizing a diode to both collect the energy from incoming signal to passively power the tag, and to produce a harmonic output modulated for identification purposes. Alternatively, a diodeless tag using a SAW device between input and output antennas may be used. When using either a diode circuit or a diodeless tag, the SAW device may be used to encode the tag with its unique impulse response, thus to provide an ID for the tag. Note that tags having different SAW devices are affixed to different items to uniquely identify them. To increase the robustness and range of the subject system, in one embodiment the transmitted energy carries the code of the sought-after item. A keyboard on the locator is used to specify the item sought by simply typing in its name. This, in turn, programs the transmitter in the locator with the appropriate coding. When the item is located, the name of the item found pops up on the display of the locator. In one embodiment, the direction and distance is presented.

As part of the subject invention, a computer such as a PC is connected to the interrogator through a USB or wireless link, with the process being similar to synching an iPod to a PC. In this way the user identifies items by familiar names that the interrogator is to detect.

In order to improve range several techniques are used. First, a highly directional antenna is used. This can be a narrow band patch antenna or an array of small dipoles such as are available for cell phones. Also, helix and yagi type antennas may be used. Secondly, cross correlation techniques provide a cross ambiguity function, correcting for frequency and range. Thirdly, frequency sweeping techniques are used in conjunction with a pseudo noise (PN) code to increase the signal-to-noise ratio and thus increase range. Fourthly, a frequency estimation system is used to correct for oscillator shift. Fifthly, a unique ranging algorithm is used. Sixth, an optional battery-powered biasing circuit for the diode detector extends range by a factor of 50% over unbiased diode tags. Finally, coding the transmitted signal with the code carried by the sought-after tag and correlating the transmitted and received code increases range.

Note that indoor propagation is nothing like outdoor propagation. Indoors, one obtains reflections from metallic objects; and one has to take into account standing wave effects. One cannot assume plane wave radiation. Instead, urban location workshops have established that the operator must move between "hot spots" where received signal strength is high. Therefore, the subject processing technique includes in one embodiment correlating the received signal with the anticipated signal in order to estimate signal amplitude. To improve robustness and as discussed above, in one embodiment the radiated signal from the locator is modulated with the ID code of the tag. Also, a small amount of frequency correction is provided through cross ambiguity function processing.

In order to find an object, the operator must move toward areas of high signal strength. The directional antenna provides a cue for locating these areas. It is assumed that signal strength is maximum when the interrogator is pointed in the direction of a hot spot. However, it is possible that the direction is a spurious reflection. Walking toward the spurious reflection still lets one find an object because the operator ends up tracing through the reflection and on toward the actual location of the object.

In summary, the interrogator has a directional antenna and means for detecting returns from tagged objects, as well as optionally estimating received signal strength. By walking through areas of high signal strength the operator traces a path toward the actual location of the object. When the object is in the direct field of view, signal propagation becomes less complex and the object is located either using monopulse techniques or through simple bearing estimation as is done outdoors using directional antennas.

In operation, the customer points the interrogator in a general direction to look for the lost article. The display shows the name of any article detected along with a measurement of progress such as "article detected", "look left for the article", "the article is at range x".

The subject reader being directional increases range and can project large amounts of power in a given direction to find lost articles, even through walls which attenuate tag signals. At the same time, the power level is controllable both for safety and to reduce interference.

The system is provided with digital processing inside the interrogator to substantially increase range. In one embodiment, a variation on cross ambiguity function processing techniques enables the reader to detect returned signals falling well below the noise floor and utilizes correlation techniques and frequency estimation methods to increase robustness.

In another embodiment, rather than utilizing a batteryless tag, the tag is provided with a thin film lithium ion battery. It is been found that biasing the diode in an RFID tag with a battery increases the range by 50%. T his means that articles can be more readily found behind walls, behind blocking objects such as a pillow on a couch, and can be made to operate at much longer ranges than those associated with the golf ball detection technology discussed above. In one embodiment, ranges in excess of one mile are possible.

While a number of RFID tag technologies are usable in the subject invention, back scatter using a SAW delay line and BPSK Barker coding not only increases range for passive batteryless tags, but also due to the different impulse response of a SAW device uniquely identifies or codes the item. An RFID kit can involve as many as ten tags, each with its own specially coded SAW device.

Other tags usable in the subject invention include passive AM modulated backscatter tags, and multi-resonant load on tags with a chirped/swept interrogator. Tag technologies include remodulated backscatter with frequency offset from phase shifters, remodulated backscatter with frequency offset from a local oscillator and mixer, re-modulated backscatter using harmonic generation involving both active and passive devices, use of a "rectenna" and a so-called smart chip, a dispersive antenna for chirp charging of "rectenna" type tags and a passive transceiver, commercial transceivers using RFID commercial off-the-shelf parts and time expired beacon technology.

It has been found that an amplified SAW tag gives the most range and basically involves amplified backscatter cross sections with modulation and a one microsecond time delay to differentiate between other reflections. Note that SAW delay devices avoid the clutter by using time delays. These SAW delay lines have the most range of all the passive tags.

Note also that remodulated tags avoid clutter by either phase modulation to offset the carrier frequency, or by mixing with a local oscillator, or by using harmonic generation. All of these techniques reduce background and ease the requirement on dynamic range.

By way of further background, in the commercial world there are at least two passive technologies. First, so called "rectennas" are used to harvest power from the interrogating signal. For example, the common entry badge reader uses a rectenna which charges up a capacitor and drives internally-carried memory and an oscillator in a smart chip configuration. The main limit for this technology is the required −30 dBm charging power. Second, and behind the rectenna technology, are SAW dispersive delay lines at the feed point of the tag antenna. The "barcode" information is contained in the SAW device and is provided by specifically placed reflectors in the SAW path. These reflectors indicate one or zero at specific delays along the path.

In summary, passive batteryless tags are used with modulation techniques to indicate the identity of the tag. Upon interrogation by the reader, the tag powers itself and emits an RF signal which is transmitted omni-directionally. This emitted signal is transmitted back to the reader with the encoded information. Upon receipt, the reader displays the selected name for the detected tag, thus quickly identifying what has been found. The displayed tag name is uploaded to the reader from a computer which stores a list of tag IDs and the user-defined name for the particular tag.

The reader is provided with a relatively narrow beam antenna such as provided by a yagi or helix, with the extended range of the system involving frequency sweeping and pseudo noise coding to which correlation techniques are applied. Further, range extension is accomplished by transmitting the code for the tag sought and using correlation techniques. A 50% range increase is also possible when using battery-powered diode biasing. Further, range to an item is detected using a unique range algorithm.

BRIEF DESCRIPTION OF THE DRAWINGS

These and other features of the subject invention will be better understood in conjunction with the detailed description in connection with the drawings of which.

DETAILED DESCRIPTION

Central to the idea of the subject invention is the provision of a locator that is programmable to search for and locate specific items in an urban environment. As is often the case an individual has a need to locate more than one type of item in his house or building; and while items can carry tags for identification purposes, an individual usually only wants to locate one item at a time.

Tagged items may be spread around a room or building and it is the purpose of the subject locator to be able to project a narrow beam to sweep out an area and to detect only the selected tagged item.

Figures 1, 2:
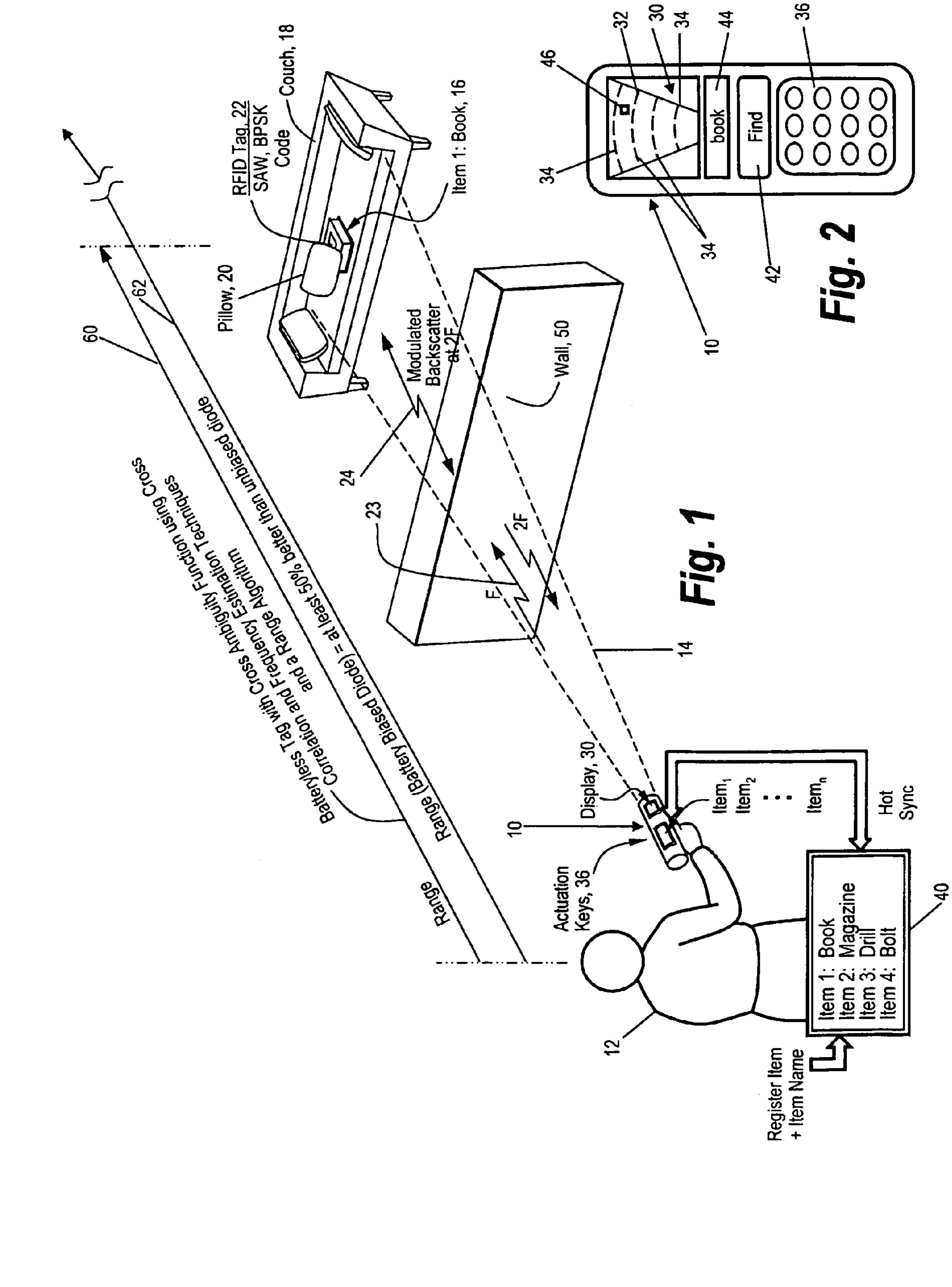
FIG. 1 is a diagrammatic illustration of the subject locator in which actuation keys code the item to be found and in which a narrow beam is projected in an area to which the item is thought to be located, with modulated backscatter twice the frequency of the projected signal being detected by the locator and the item detected displayed.
FIG. 2 is a diagrammatic illustration-of one embodiment of the subject locator showing the key pad for specifying the item to be found, a FIND button, and a display which includes an indication of the item found along with its location and direction.

Referring now to FIG. 1, a locator 10 is a handheld device held by an individual 12 which provides a narrow interrogation beam 14 that may be swept about an area in which a number of tagged items may exist.

In the illustrated embodiment Item 1 is a book, here illustrated at 16, which is buried in a couch 18 potentially covered up by a pillow 20.

The item carries an RFID tag 22 which in the preferred embodiment has a surface acoustic wave or SAW coding device. The coding device is provided with an ID code by the construction of the fingers of the SAW device. It is contemplated in one embodiment that a locator kit will include as many as for instance 10 RFID tags, each with SAW devices configured to provide different BPSK codes.

When the device is interrogated by beam 14, and as will be discussed, energy in the beam powers the RFID tag that in one embodiment carries a diode which after having been powered produces a harmonic backscatter signal at two times the frequency of the interrogating signal.

Thus, as illustrated at 23, the frequency of the interrogating energy is F and the backscattered and modulated return 24 is at twice this interrogating signal frequency.

As will be discussed, the identity of the detected tag is shown at a display 30, which, as can be seen in FIG. 2, includes graphics 32 indicating the location of the item and the direction of the beam as well as range from the locator to the item, with the range being provided by range rings 34.

Central to the ability of the locator to search for a particular tag is the utilization of a keyboard 36 which is used to type in the name of the item to be located.

Referring back to FIG. 1, all of the tags in the kit are registered in a computer 40 along with a name assigned to the particular tag by the individual seeking to use the locator.

Thus, for instance, Item 1 can be tagged with the name "book", Item 2 with the name "magazine", Item 3 with the name "drill", and Item 4 with the name "bolt".

Locator 10 is provided with internal electronics that has a memory and CPU that can be synchronized with computer 40 and more importantly is able to upload tag codes of the registered items and item names from computer 40.

In operation, individual 12 keys in the name of the item to be located which has associated with it a predetermined RFID tag code. In one embodiment, the code is modulated onto the interrogating signal so that only the tag having the corresponding code is activated to provide backscatter radiation.

In this matter the coded signal from locator 10 is correlated with the code in the RFID tag such that only the tag having the RFID code radiates back towards the locator.

This correlation between the coded signal transmitted out and the coded signal coming back to the locator increases the robustness of the system and also increases range as will be discussed.

When a series of RFID tags is provided in a kit along with the locator, the individual using the locator registers item tags along with the tag name.

Referring back to FIG. 2, once the operator has keyed in the name of the sought-after item, he presses a FIND button 42. In the illustrated example the named keyed in is "book", and when the tagged book is found, the label for the item found is displayed as illustrated at 44. In this case the item found is the "book" in question.

The location of the item found is also displayed on display 30 by an icon 46 which appears when the backscatter return is received at the locator. The position of the icon on display 30 within beam 32 indicates the direction of the sought-after item relative to the center line of the beam as well as its location. The position of the detected item is displayed relative to range rings 34 which indicate the distance of the detected item from the locator.

Again referring back to FIG. 1, it is the purpose of the subject invention to find or detect specific tagged items within an urban environment. The urban environment, unlike finding items in the open, is replete with metal objects which cause multi-path distortions and also disturb the standing waves either transmitted towards the object having the tag or harmonically transmitted back from the tag.

It is a feature of the subject invention that various techniques are utilized to extend the range and thus the robustness of the locator when specifically used in an urban environment, in which the signals from the locator may for instance need to pass through a wall 50 which attenuates signals both in the forward and reverse directions, through floors, and through furniture. Note that the objects through which the interrogation beam and the backscatter pass may both attenuate signals due to the material that it is made of and may also generate ghosts or reflections due to metal in the various objects.

As will be discussed, it is important to have as much range as possible for the locator. Range in general is proportional to the power of the transmitter within the locator which as mentioned before is limited due to Federal Communications Commission requirements. In one embodiment, the output power of the locator may be varied to take into account existing or new FCC regulations.

Thus, an item locator that can be used in the open where there is no interference from urban dwellings and structures or the like, when used in an urban environment is severely range-limited.

It is therefore important to be able, within FCC regulations, to provide robust item location within buildings, through floors, behind walls, regardless of multi-path distortions. In one embodiment a batteryless tag location system provides cross ambiguity function processing using cross correlation and frequency estimation techniques to extend the range 60 from individual 12 to the item in question.

Also, providing a range algorithm which works in urban environments is important if the range to the item is to be appropriately displayed on display 30.

Rather than using amplitude alone, sophisticated range algorithms are employed which operate, in one embodiment, with pseudo random noise coding and frequency sweeping to be able to ascertain the distance of the tag from the locator. The cross ambiguity function, cross correlation, frequency estimation and range algorithms are described hereinafter.

The ranging algorithm in one embodiment involves some combination of veneer processing the cross ambiguity function peak to exploit the SNR margin to get sub range bin resolution on the correlation. This technique is well known in the art and can be implemented by fast fourier transform interpolation of the correlation peak. Alternatively or additionally, the reader can fire a second waveform, namely a wideband pulse that resolves the range to the object using range gating techniques. The correlation method is preferred as it is less susceptible to spurious reflections since the returned signal is marked with the searched object's identification code.

Specifically, in one embodiment range determination involves the cross ambiguity function as described in the literature, notably by Harry L. Van Trees, in "Detection, Estimation, and Modulation Theory, Part III". The cross ambiguity function is a technique for jointly estimating range and Doppler frequency. This is done by essentially measuring the similarity between a complex-valued signal and a replica of it that shifted in both time and frequency. If $s_T(t)$ is the envelope of the transmitted signal (i.e., the PN code), and $s_R(t)$ is the received signal after frequency-down conversion, the resulting 2-D time-frequency cross ambiguity function is given by $$\Phi(\tau,f)=|\int^{\circ}_{\infty} s_R(t-\tau/2)s^*_T(t+\tau/2)e^{j2\pi ft}\,dt|^2$$

Here, the estimated time-delay and Doppler-frequency difference between the two signals are determined by the location of the peak of this function over τ and f. The range is then simply calculated from the time-delay. Drift in the transmit oscillator can be estimated by first dividing the received signal data into subsections, and then computing the time-frequency cross ambiguity function for each section (and tracking the frequency). In addition, the estimated frequency from the ambiguity function can be used to adjust the transmit oscillator such that the estimated frequency drift is driven to zero, thereby possibly making the computation of subsequent ambiguity functions easier.

In summary, there are two approaches to estimating the range to the tag. The first approach uses correlation processing. When the object is far away, there is little excess SNR and one uses relative amplitudes vs. pointing direction to get a bearing to the object. As one approaches the object from a constant bearing, the amplitude continues to grow until there is sufficient SNR to begin interpolating the correlation peak.

This interpolation is necessary because one anticipates interrogation waveform bandwidths of between 1 and 20 MHz, corresponding to range bins going between 1000 feet and 50 feet respectively. However, by interpolating within the range bin having peak range, the correlation peak location can be estimated to a small fraction of the width of the range bin. This corresponds to ranges of between 100 feet down to ½ foot, depending on the interrogation bandwidth and the SNR. This technique is well known from radar range estimation and passive communications emitter ranging and navigation.

An especially efficient implementation involves zero-padded FFT processing as is described in many references including for example, Seymour Stein, "Algorithms for Ambiguity Function Processing", IEEE Transactions on Acoustics, Speech and Signal Processing volume ASSP-29, June 1981 pp 588-599. Due to advances in microelectronics, these sophisticated signal processing techniques may now be performed in a comparatively small and inexpensive processor suitable for consumer products.

In addition, note that very few range bins are actually necessary due to the indoor geometries anticipated. In order to correct for oscillator frequency drift in the transmitter of the locator, frequency estimation techniques are utilized to detect from the returned radiation any shift in the initial oscillator output. The frequency of the returned signal may be tested for the cross ambiguity function and the results are used to adjust the oscillator in the locator. Moreover, few frequencies are tested for the cross ambiguity function as the frequency ranges correct small local oscillator drifts during the interrogation process only.

A second more simplified ranging approach is to transmit a very wideband ranging pulse. When the pulse rise time is only a few nanoseconds, measuring the return pulse time delay will provide range resolution to a few feet. However, this approach suffers from spurious reflections by metallic objects. Thus, the returned pulse must have sufficient amplitude to detect the code transmitted by the tag as part of demodulating the received signal.

Moreover, as part of the subject invention, it has been found that rather than using a batteryless tag, providing a small thin film battery to bias the diode in the tag increases the range by 50%.

It has been found that pre-biasing the diode increases its sensitivity as a detector and further increases the backscatter power so that tags can be for instance detected in terms of miles not feet.

Moreover, the subject system can be used in urban environments to locate individuals which who carry tags, such as for instance for identification of friend or foe, in which the individuals can be located behind buildings or walls. The ability to detect tagged individuals in an urban environment is in part due to the increased range provided by diode biasing.

Thus, for people location as well as item location, the subject technique is made robust through the utilization of diode biasing and it is the finding of the subject invention that over batteryless tags, a 50% increase in range is achievable as illustrated by arrow 62.

Figure 3:
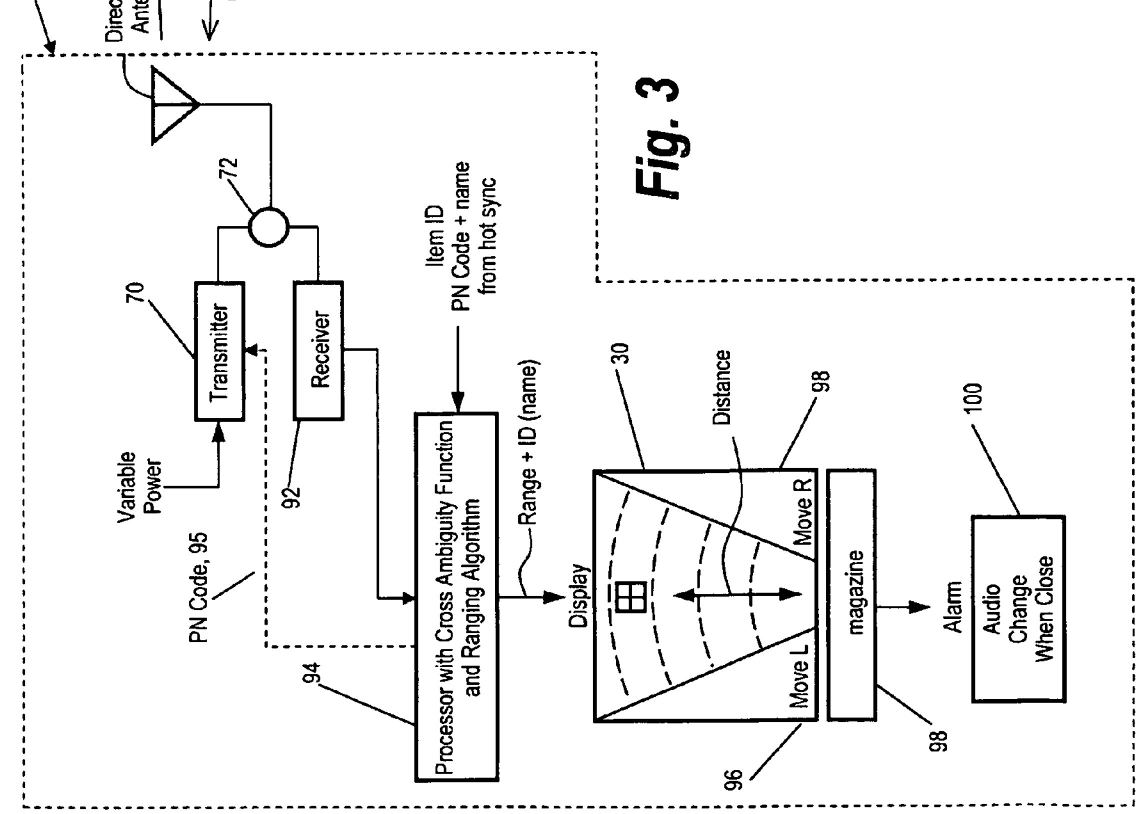
FIG. 3 is a diagrammatic representation of the subject invention in which a variable power transmitter transmits a sweep of energy through its directional antenna, with the energy intercepted by an RFID tag having a diode, in which the backscatter from the tag is coded and received, wherein a processor applies a cross ambiguity function and ranging algorithm to output the range to and the ID of the tag found.

Referring now to FIG. 3, locator 10 houses a transmitter 70 coupled via a circulator 72 to a directional antenna 74, which may be a yagi or helix antenna that projects a narrow interrogating beam 76 towards a tagged item 78 having a tag 80. Tag 80 is diagrammatically shown as having an input antenna 82 coupled to a diode 84, with an output antenna 86 coupled to the output of the diode.

Modulation 88 is applied to modulate the signal from diode 84 such that the backscatter radiation 90 is coded, with the code being the unique code associated with the item.

Locator 10 has a receiver 92 which is coupled to a processor 94 that has embedded in it the cross ambiguity function and ranging algorithms described above, with the item ID code and name inputted to processor 94 from the aforementioned hot-synch operation.

The output of the processor includes the range of the tagged item as well as its ID or name. As will be appreciated, the name of the detected item is coupled to display 30.

In one embodiment processor 94 outputs signals which not only relate to the ranging information derivable from the received signal, but also to the direction of the item to permit generating instructions like "move left" as illustrated at 96 or "move right" which is illustrated at 98. Thus, the individual using locator 10 knows which way to swing the beam of the device. The direction of the item can be derived from monopulse technology which is used to detect the direction of the tag. In monopulse processing the received pulse is received by two receive antennas spaced apart by a wavelength. The phase difference between the two received signals is then used to detect the direction of the source, namely the tag. This system is effective to indicate whether the tag is to the "left" or the "right" of the locator centerline, or to provide an arrow on the display which points towards the tag.

The signal-to-noise ratio may be a factor in the ability to utilize the monopulse technique; and multi-path and standing waves, especially in a room with very reflective walls, as in commercial buildings, may adversely affect the monopulse determination.

As will be appreciated, higher frequencies are more useful in tag detection because the interrogator can pick the first returned signal and ignore later ones. Thus for monopulse systems, operating at 5 gigahertz is preferred. Also the separation of the two receive antennas is only 1 inch at this frequency, making the handheld application achievable.

With the respect to ranging, utilizing 5 nanosecond chirped pulses results in a 1 foot resolution. Moreover, if the range resolution is given by 1/BW and the bandwidth is 1 gigahertz one obtains a 1 foot resolution.

Referring back to FIG. 3, from the output of processor 94 comes the name of the detected item, in this case the name "magazine" as shown at 98. Optionally an alarm unit 100 may be coupled to processor 94 to provide an audio alarm that changes either in intensity or frequency when the locator closes in on a tagged item.

Processor 94 can also be used to output a PN code 95 to transmitter 70 for the encoding of the interrogation beam from directional antenna 74 to a tag coded with the PN code. This improves the robustness of the subject system by increasing the signal-to-noise ratio and thus the range. It also makes the system more immune to noise and other signals. In one embodiment, the PN code is uploaded to processor 40 from computer 40 of FIG. 1.

Figure 4:
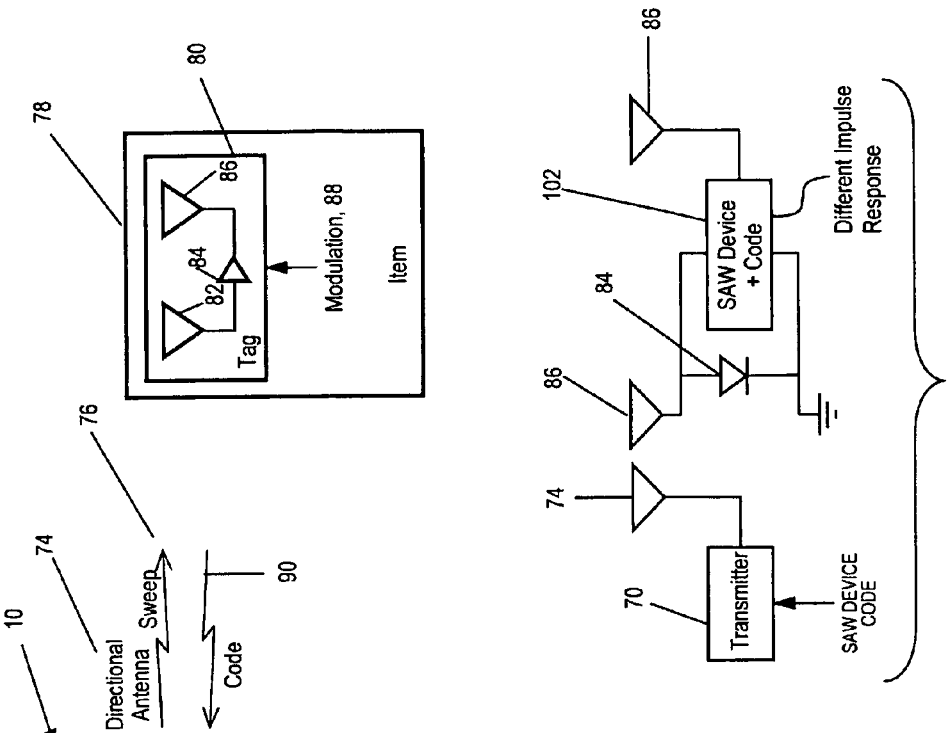
FIG. 4 is a block diagram showing the transmission of a coded interrogation signal towards a tag, and a diode tag having a SAW device positioned between the diode and the transmit antenna to code the tag due to the different impulse response of the SAW device.

Thus, while the subject system may be utilized with an unencoded interrogation signal from transmitter 70, in FIG. 4 the output of transmitter 70 is modulated with a code corresponding to the code of the tag sought. If the tag is encoded using a SAW device, then the SAW device code is that which is modulated onto the signal from transmitter 70. Note that in this embodiment, a SAW device 102 is employed which carries its own unique individual code in terms of its impulse response. Here, the SAW device is coupled between diode 84 and antenna 86.

In operation, the interrogating signal from transmitter 70 is detected by diode 84 and the output signal is modulated by the SAW device 102 impulse characteristic. This occurs only when the signal detected at diode 84 contains the same SAW device code.

Figure 5:
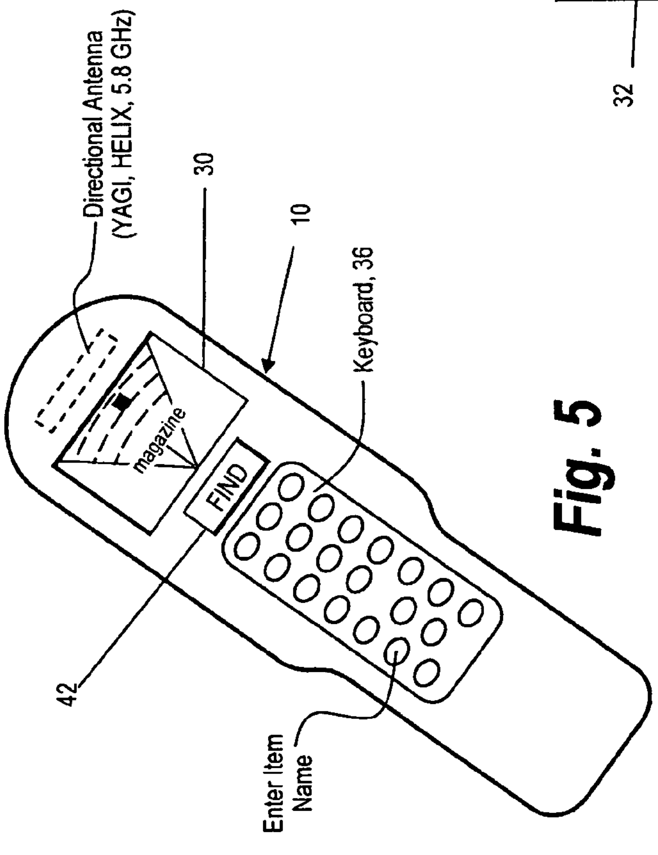
FIG. 5 is a diagrammatic illustration of one embodiment of the subject locator showing a keyboard with which to enter the item to be found, a FIND button, a directional antenna, and a display which displays the identity of the found item and its location.

Referring now to FIG. 5, locator device 10 may be in the form of a flashlight or tubular configuration having keyboard 36 thereon, with display 30 providing the information described hereinbefore.

In order to fit in a flashlight type device the directional antenna may be a miniature yagi or helix, assuming the system operates close to 6 gigahertz, so as to be able to provide a reasonable sized directional antenna.

Figure 6:
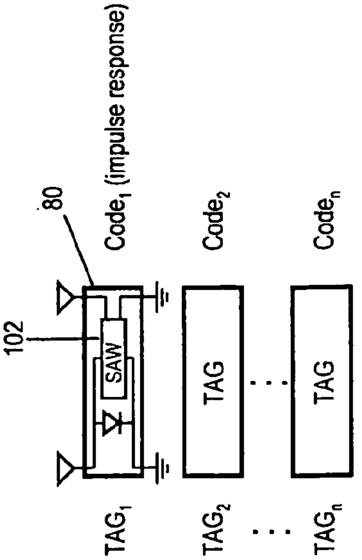
FIG. 6 is a diagrammatic illustration of a number of a different tags which can be fixed to items, with the tags including a diode and a SAW device having a characteristic impulse response to carry the particular code for the tag.

As shown at FIG. 6 individual tags 80 may be provided with their own SAW devices 102 to provide different impulse responses and therefore different codes to the tag.

Figure 7:
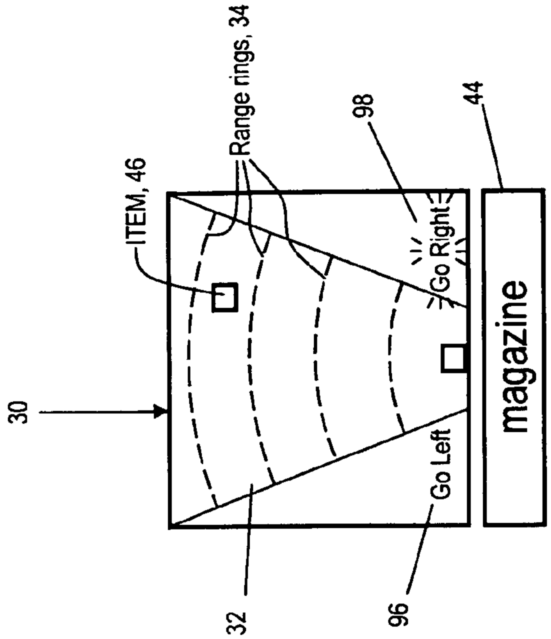
FIG. 7 is a diagrammatic illustration of the display of FIG. 5 in which the detected item is identified and displayed both in terms of its direction and range, with indicia on the display indicating to "go left" or "go right" relative to the centerline of the display.

As illustrated in FIG. 7 in greater detail, display 30 shows the representation of beam 32, range rings 34, item 46 and instructions as to which way to move the locator beam, namely "go left" 96 and "go right" 98. Also the identity of the found item is illustrated at 44.

Figure 8:
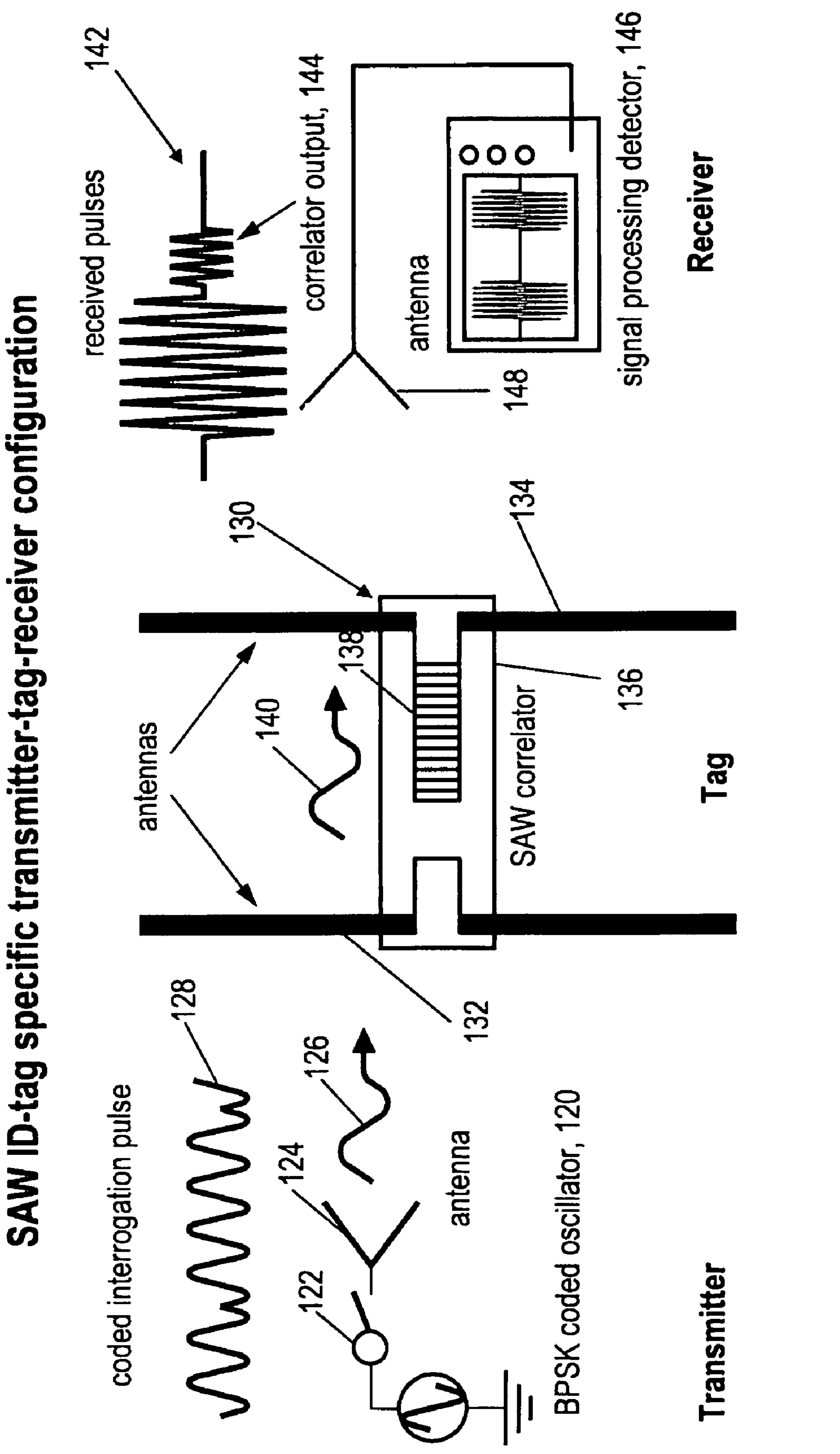
FIG. 8 is a diagrammatic illustration of a SAW ID tag-specific transmitter-tag-receiver configuration in which an interrogating signal carrying a BPSK code illuminates a tag which carries a SAW correlator, with the received pulses when correlated having the indicated waveform and with receiver processing the correlator output to provide an indication of the found tag.

Referring now to FIG. 8 one of the more attractive ways to increase the gain of the system and to make it more robust is to provide a coded interrogation beam in which the coded beam corresponds in code to the code of the SAW delay line in the tag.

Here, a diodeless tag can be provided having two antennas and a SAW delay line correlator in which the SAW delay line avoids clutter by using a time delay.

As can be seen, a transmitter can include a BPSK coded oscillator 120 which switches a pulse at 122 to an antenna 124. Here the interrogating signal 126 includes a coded interrogation pulse 128.

As illustrated, tag 130 includes a receive antenna 132 and a transmit antenna 134, with the receive antenna and transmit antenna being dipoles in one embodiment. Here, the input to a SAW device 136 is at one end of the SAW delay line correlator.

The impulse response of the SAW device is determined by its interdigitated fingers 138, such that as the acoustic wave 140 propagates down the correlator, the impulse response of the SAW device imparts a code to the acoustic wave.

The acoustic wave contains the original signal at $F_1$ modulated by the output of the acoustic wave delay line. This modulated signal is transmitted out of dipole 134. At the locator the received pulses 142 with modulated code are correlated by a correlator 144, the output of which is detected by a signal processing detector 146 coupled to antenna 148.

Note that the so called "barcode" information is contained in the SAW device dispersion due to specifically placed interdigitated reflectors in the SAW path, corresponding to one or zero as specific delays along the path. Note also that the use of SAW devices requires a hard wired approach in which the coding of the SAW devices is provided at the time of tag manufacture.

It is a design goal for the subject system to have a range in terms of a few miles and to have a directionality for the interrogation beam of for instance less than 20° for its beam width. In a preferred embodiment of the subject invention, backscattering is preferred over remodulation because backscattering reradiates 100% of the captured energy. Additionally, pseudo noise, PN or other modulation produces a 30 dB processing gain, whereas frequency dispersion provides additional discrimination.

Backscattering using SAW delay lines and BPSK Barker coding involves the idea of passively coding and decoding a transmission. Only the tag with the correct decoder or encoder on the tag, namely a SAW correlator, will give a positive response at the interrogator receiver.

Assuming a 1 megahertz bandwidth chosen because the tag can modulate its retransmission, the receiver has a correlator which converts the modulated signal to a detected pulse. Alternatively, the interrogator transmit signal can be modulated and the tag SAW acts as a correlator, with the output from the tag being a pulsed unmodulated CW signal.

No matter what assumptions are made about bandwidth broadening and processing gain from the correlator, these two terms are the inverse of each other, at least ideally. Hence, a bandwidth of 1 megahertz and a processing gain of 30 dB come down to an equivalent of 1 kilohertz bandwidth at the receiver for a CW signal.

Figure 9:
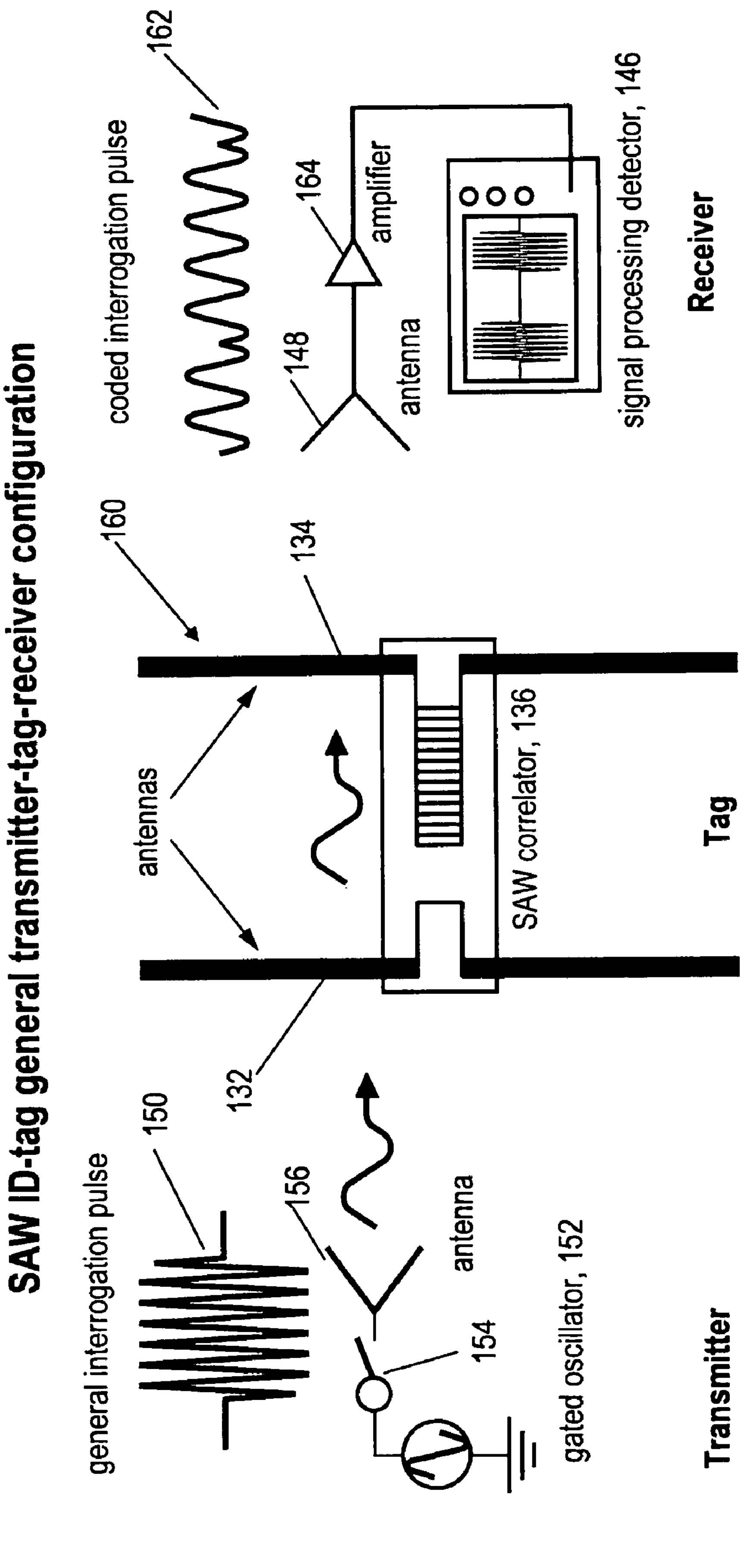
FIG. 9 is a diagrammatic illustration of a SAW ID tag general transmitter-tag-receiver configuration in which an oscillator is gated to provide a general interrogation pulse and in which the interrogation pulse is detected by the tag, processed by the SAW correlator and backscattered towards the receiver, with signal processing at the locator detecting the presence of the coded tag and its identity.

Referring to FIG. 9, one can have a general interrogation pulse 150 produced by a gated oscillator 152 switched by a switch 154 to antenna 156 from whence it propagates towards tag 160. This tag is identical to tag 130, with like elements bearing like reference characters.

The signal transmitted back to the interrogator is the interrogation pulse modulated by the tag code as illustrated at 162. This signal is incident on antenna 148, is amplified at 164 and is then provided to signal processing detector 146

The use of the SAW delay device and correlator provides a unique identity to the tag that can be detected assuming the coded interrogation pulse returned from the tag is amplified.

Figure 10:
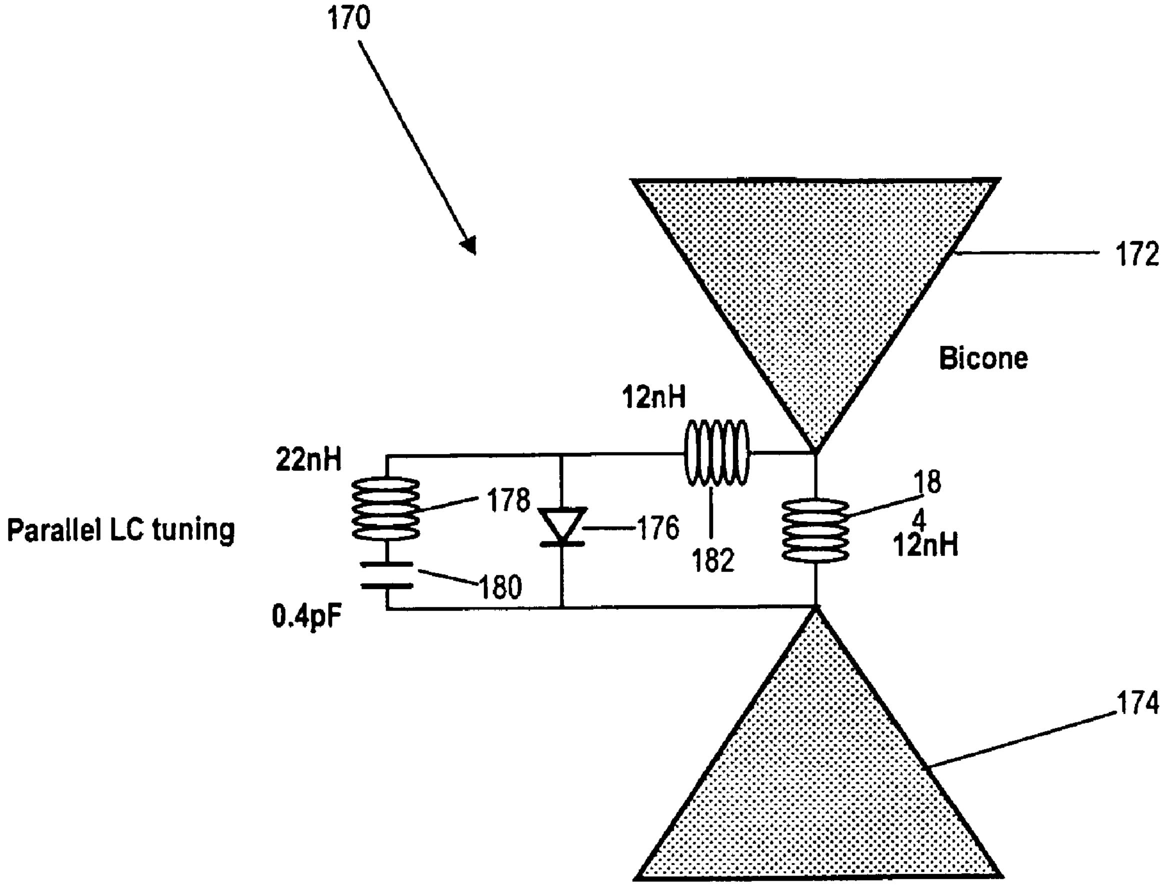
FIG. 10 is a diagrammatic illustration of parallel LC tuning for a diode tag coupled to a bi-cone antenna.

As to tuning antennas to a diode, and referring now to FIG. 10, a Parallel LC tuning circuit tunes a bi-cone antenna having sections 172 and 174 to a diode 176.

The tuning for the diode includes a 22 nanohenry inductor 178 in parallel with a 0.4 pF capacitor 180, with a 12 nanohenry inductor 182 between the diode antenna section 172 and 12 nanohenry inductor 184 coupled between the two bi-cone halves.

Note, the series LC circuit in parallel with the diode tunes the harmonic and inductance in parallel with the diode to the fundamental frequency using the capacitance of the diode at achieved resonance. The parallel inductance also prohibits reverse dc voltage buildup which would degrade harmonic response.

It will be appreciated that tuned circuits acting as filters at the receive antenna for the RFID tag can code the tag as to frequency. Backscattered radiation from a tag utilizing these tuned circuits can thus be distinguished from other backscatter by filtering at the locator's receiver.

Figure 11:
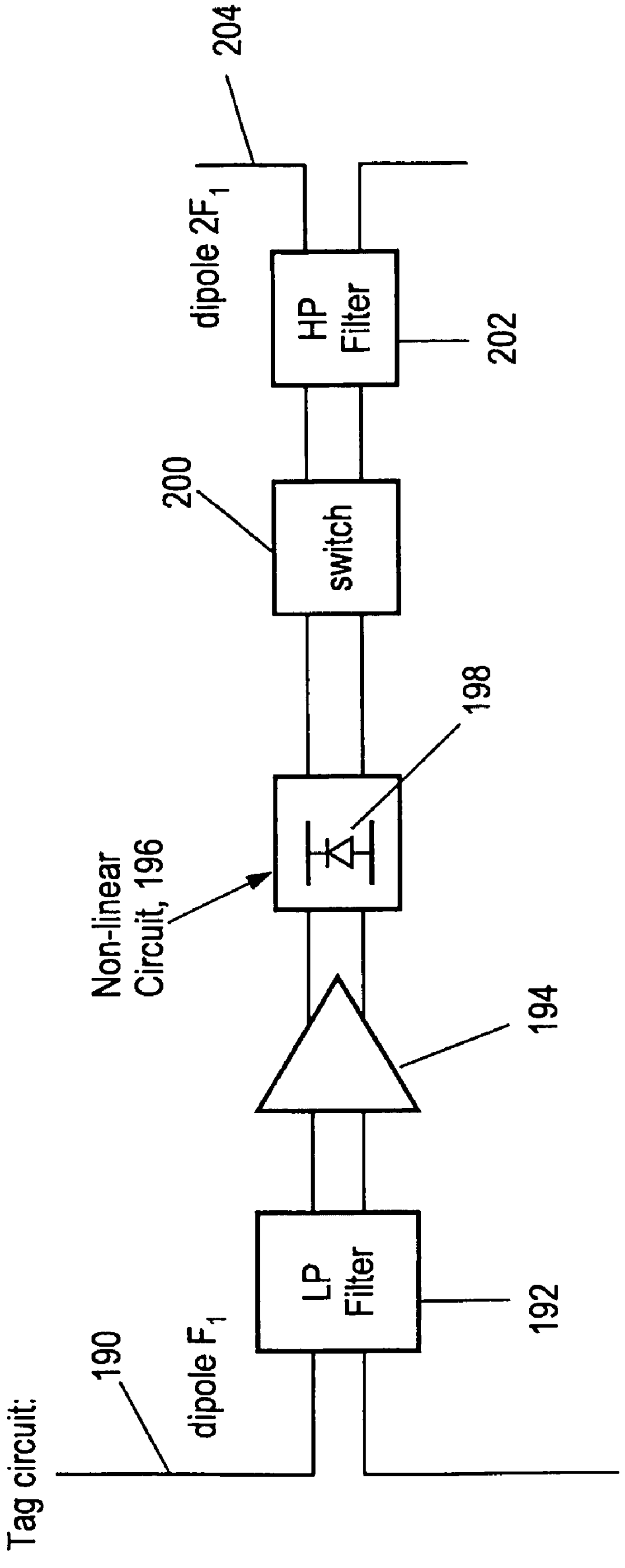
FIG. 11 is a block diagram of a tag circuit including a dipole coupled to a low-pass filter in turn coupled to an amplifier and a non-linear circuit such as a diode followed by a switch and a high-pass filter to produce a harmonic backscattered signal.

Referring now to FIG. 11, in one embodiment, the tag includes a dipole antenna 190 coupled to a low pass filter 192 set to the frequency of the incoming wave, namely $F_1$. The output of the filter is amplified at 194 and is coupled to a non-linear circuit 196, which can include a diode 198.

The output of the non-linear circuit is applied to switch 200 which is used to stop self oscillation. The output of switch 200 is applied to a high-pass filter 202 set to pass frequencies above $2F_1$, with the output of this filter applied to dipole antenna 204.

With a 10 watt transmit signal, the circuit shown in FIG. 11 would have a 1 kilometer range assuming a 40 dB gain at amplifier 194. Assuming that one loses 3 dB across the switch because of energy in side lobes, switch 200 in one embodiment provides a greater than 40 dB isolation between the two antennas at all frequencies to stop self oscillation.

In one embodiment the input dipole is tuned to 975 megahertz, whereas the output dipole is set to be resonant at 1950 megahertz.

While the foregoing has described simplified tags either employing a SAW device or a non-linear element, namely a diode, it is possible to provide tags with a so-called smart chip. It is the purpose of the smart chip to code the tag with its unique identity and for instance, to provide other information that can be modulated onto the signal returned from the tag.

However, powering of smart chips with the energy from the interrogation beam is problematical. For instance, typically the RF voltage at a tag dipole is on the order of 0.1 RF volts. However, by using voltage multiplication circuits one can multiply the RF voltage by a factor of 10 and output 1 volt dc. To do so, one uses a rectenna charging circuit such as shown in FIG. 12.

Figure 12:
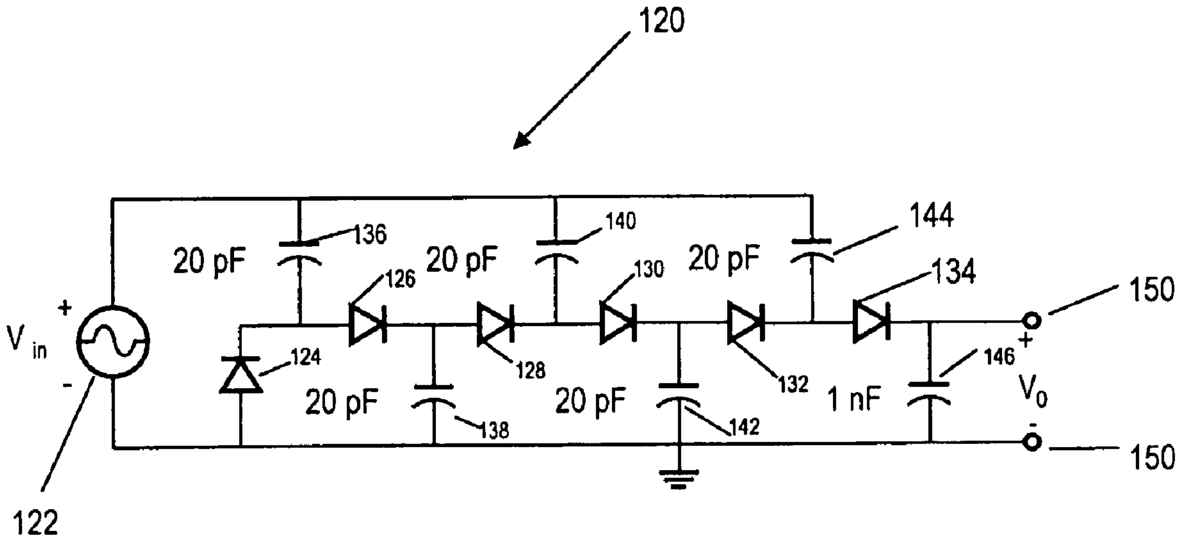
FIG. 12 is a schematic diagram of a rectenna-type diode circuit utilized to multiply the RF voltage from the interrogation signal to power follow-on smart chip technology in a tag.

Referring now to FIG. 12, a rectenna charging circuit 120 takes the RF input voltage at 122, rectifies it and multiplies it by using a number of diodes and capacitors. Thus diodes 124, 126, 128, 130, 132 and 134 are utilized in a rectification and voltage multiplication scheme in which energy is stored on capacitors 136, 138, 140, 142, 144 and 146. Note that the output capacitor is a 1 nanofarad capacitor, whereas the other capacitors are 20 picofarads.

The result is a voltage at output 150 which is sufficiently high to power smart tag circuits. As will be discussed, battery biasing the rectenna charging circuit results in better voltage multiplication. The batteries used for such biasing are long lived watch batteries that provide a 1 microamp bias for in excess of 10 years.

If one were to attempt to place batteries on tags to power the smart chips, the batteries would run down in a matter of hours. It is therefore important to use rectenna technology when using smart chips. Moreover, if one is using a smart chip with a battery, the rectenna circuits can be used to sense an interrogation beam and turn on the battery connection to the smart chip, thus to save on battery drain.

Powering smart chips directly from a rectenna circuit eliminates the need for long-lived large batteries. By using battery diode biasing one can improve the voltage multiplication of rectenna circuits to the point where the rectenna circuit can power smart chips without having to use large short-lived batteries.

From the point of view of remodulation, in a typical RFID tag, a rectenna circuit is coupled to the receive antenna of the tag. The output of the rectenna circuit is typically a 1 volt signal that is used to power an oscillator in the tag. In one embodiment, the oscillator includes a PIN diode which is turned on and off in accordance with the ID code for the tag. It is preferable that this oscillator output a frequency which is different from that of the interrogating beam. In one embodiment, the frequency output by the tag is twice the fundamental frequency of the interrogating beam. The modulated output of the oscillator is then coupled to the transmit antenna of the tag.

The result is that the backscattered radiation from the tag has a code impressed upon it which distinguishes it from backscatter from electronic equipment in the scanned area. Thus the locator can distinguish between the modulated backscatter from the tag and backscatter from radios and other equipment which backscatter is unmodulated. Thus, in a typical RFID tag system, a remodulation technique is utilized to transmit information from the tag to the locator.

In another remodulation technique, one may seek to remodulate backscatter with a frequency offset and this can be done using phase shifters and phase shifts/Doppler shift modulation to offset the carrier frequency.

The idea in one embodiment is to 100% convert the interrogator signal at the tag to a different frequency using phase modulation. Because the conversion between to the two frequencies is ideally 100%, the tag provides low loss and the new frequency does not have background signal issues at the receiver.

Figure 13:
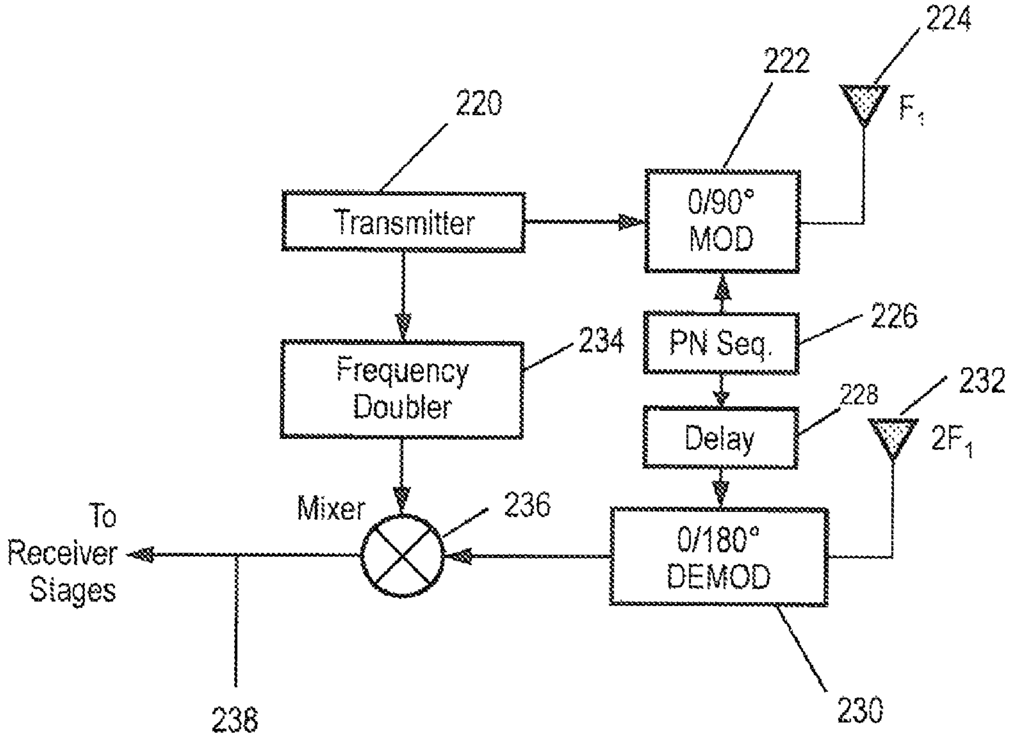
FIG. 13 is a block diagram illustrating the utilization of a transmitter in which pseudo noise sequence modulation is used, the output of the transmitter being delayed and provided to a demodulator, with the output of the transmitter being frequency doubled and coupled to a mixer to which the output of the demodulator is coupled, and with the mixed output applied to receiver stages.

Referring to FIG. 13, another RFID technique involves phase shifting the output of the transmitter at the locator in accordance with a PN code. To implement this technique, a transmitter 220 in a locator is coupled to a 0/90° modulator 222 which is coupled to an antenna 224 that transmits at the fundamental frequency. A pseudo noise sequence generated at 226 is applied to modulator 220 to phase shift the transmitted signal. The PN sequence is also coupled to a delay line 228 which is applied to a 0/180° demodulator 230 to which a receive antenna 232 is coupled. The receive antenna receives the harmonic response of the tag. The tag backscatters a signal at 2F modulated with a PN code sequence that is 0°/180° modulated with this code.

For baseband processing, the locator frequency doubler 234 doubles the transmit frequency and applies the doubled frequency to a mixer 236 which mixes the output of the 0/180° demodulator receiving the $2F_1$ signal to baseband. The output of the mixer is then coupled to receiver stages as illustrated by arrow 238. This describes a correlation technique in which the transmitted pseudo noise sequence is delayed and applied to the 0/180° demodulator 230 to correlate the $2F_1$ tag signal with the encoded transmitted signal.

Figure 14:
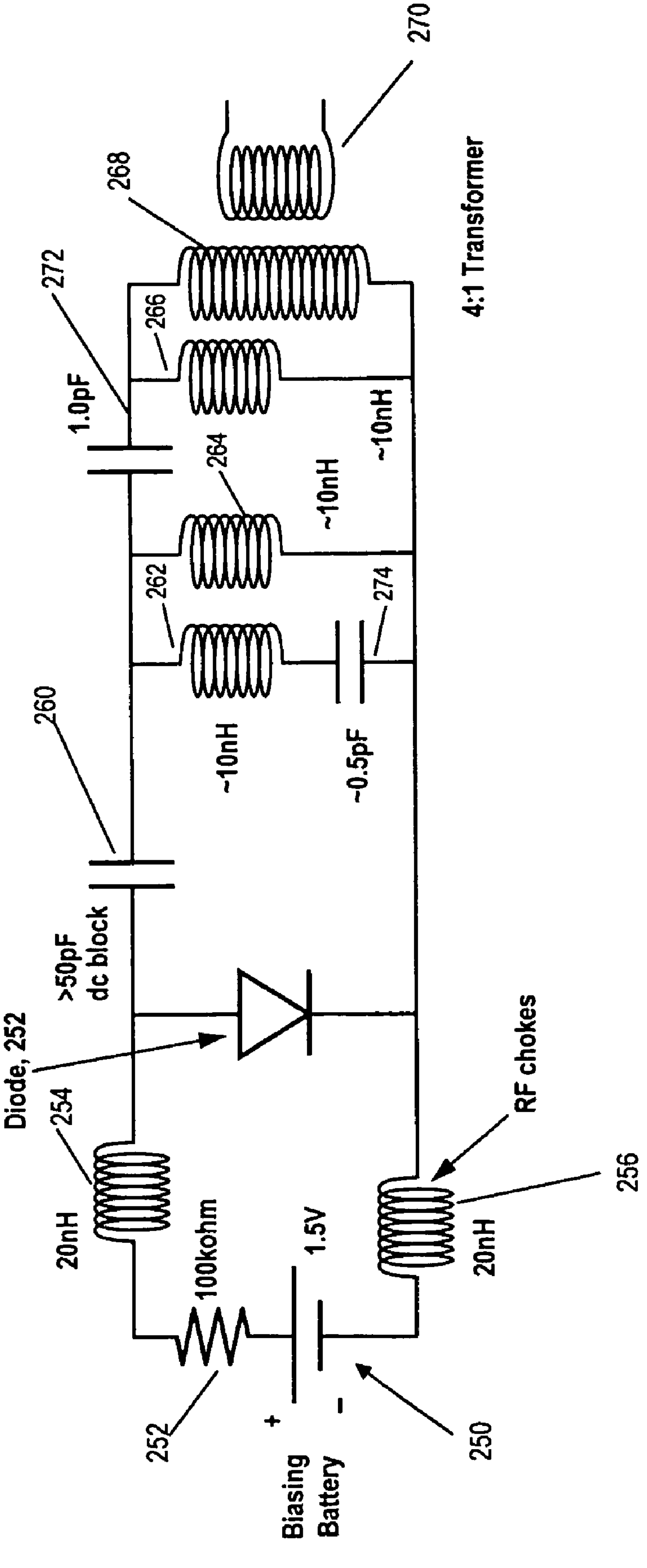
FIG. 14 is a schematic diagram illustrating the utilization of a biasing battery which extends the range of a tag employing a diode; and, FIG. 15 is a block diagram of a regenerative tag that uses a battery-biased rectenna diode rectifier circuit for scavenging energy from an interrogation beam to provide a 10× range increase for the tag.

Referring now to FIG. 14, a biased diode tag circuit is shown in which a biasing battery 250 is utilized to bias a diode 252. Here it can be seen that a 100 ohm resistor 254 is connected from the positive terminal of battery 250 through a 20 nanohenry inductor 254 to diode 252, whereas the negative terminal battery 250 is connected through a 200 nanohenry inductor 256 to the other side of diode 252. Here, the inductors serve as RF chokes.

The output of the diode is coupled through a capacitor 260 and through a tuning circuit comprised of inductors 262, 264, 266, and 268 that couples the diode out to the secondary of a transformer 270 used to measure the harmonic performance of the diode.

Note that there is an output capacitor 272 and an LC circuit comprising inductor 262 and a further capacitor 274.

The circuit shown in FIG. 14 was used to establish the range augmentation of the system when utilizing a battery-biased diode. The range augmentation was tested by using a 4:1 Transformer comprised of inductors 268 and 270. It was found that there was a 10 dB increase in power resulted when battery biasing the diode. This translates into a 10× output power increase in the harmonic output of the diode that translates into a 50% range increase. Put another way, with battery biasing at least 10 dB lower minimum detectable signal was achieved with $1/R^2$ propagation loss as a standard of comparison. This could result in a 3.16:1 increase in range for 1/10th the power for the same output voltage. If one uses an inverse fourth power propagation loss, one obtains a 1.77:1 or a 77% increase in range.

A 10 dB increase in harmonic response of the diodes means that the incident power can be 5 dB lower, and the same harmonic power will be generated. This is due to the $Power^2$ dependence of the harmonic power on the fundamental frequency power. Hence the range is $(R2/R1)^2=10\^(5\ dB/10)$ =>R2=1.77*R1. This is a 77% increase in range.

In summary, as to diode biasing it has been found that biasing a diode improves the harmonic response of the diode, and therefore increases the effective range of the system. Secondly, when voltage multiplication techniques using a series of diodes is employed, the effectiveness of the voltage multiplication is improved with diode biasing.

Thus the subject invention can either be diodeless, having a diode which operates harmonically, or can involve the use of a smart chip powered by the voltage multiplication afforded by a rectenna type circuit.

While battery biasing of diodes has been described as resulting in a 50% range improvement over unbiased diodes, when battery biasing is used with rectenna circuits and the rectenna circuit is to power a so-called regenerative tag, then a 10× range improvement results.

In a regenerative tag the signal from the rectenna circuit is applied across a capacitor which when discharged provides a signal that is modulated with the ID of the tag. This signal is transmitted from the tag using the transmit antenna for the tag. Thus, while the 50% increase applies to passive tags involving diodes, when a regenerative tag uses a rectenna circuit augmented by battery biasing, the range increase is much better than 50% and approaches 10 times that associated with unbiased diodes.

More particularly, note that RF power scavenging systems allow for the design of batteryless radio-devices. The systems convert RF power into DC power in which electronic circuits can operate. DC power may be continuous or pulsed. If micro-watt levels of power are available, scavenging systems such as rectenna circuits may be biased to greatly improve performance, on the order of 15-20 dB.

Since regenerative tags are powered by rectenna circuits, the power received by a regenerative tag being proportional to the inverse square of the range results in a 20 dB improvement in power scavenging; and this produces a ten-fold increase in range.

It could be thought that if one had a battery already why would one want to be rectifying RF from an interrogation beam to make DC? The reason is that such batteries would have an exceedingly short life.

However when battery biasing rectennas with a small nanocurrent watch battery that biases the diodes, one achieves a 10+ year tag life with a hundred-fold improvement in power scavenging efficiency. Improving scavenging efficiency is why one gets $1/r^2$ range dependence and a ten-fold range increase. This is to be distinguished from putting a battery-powered receiver in a tag which would be expensive and inconvenient for a consumer due to limited battery life and the added cost.

In the subject invention, in one embodiment one has a nanocurrent battery to bias the rectenna circuit so one can have a battery powered receiver in the tag pretty much for free without any decrease in other capabilities or convenience.

In a further embodiment, when using a large battery to power the regenerative tag, the tag is dormant and in a batteryless mode until it gets addressed. Then in a wake up function its large battery turns on, enabling many other functions. Note, if the large battery powers a receiver, it will burn out quickly absent the above wake up function. However, large batteries and the wake up function can be avoided if one biases a diode network with a small battery, since it will last for years.

Thus nanocurrent biasing dramatically improves power scavenging and dramatically improves tag range.

Figure 15:
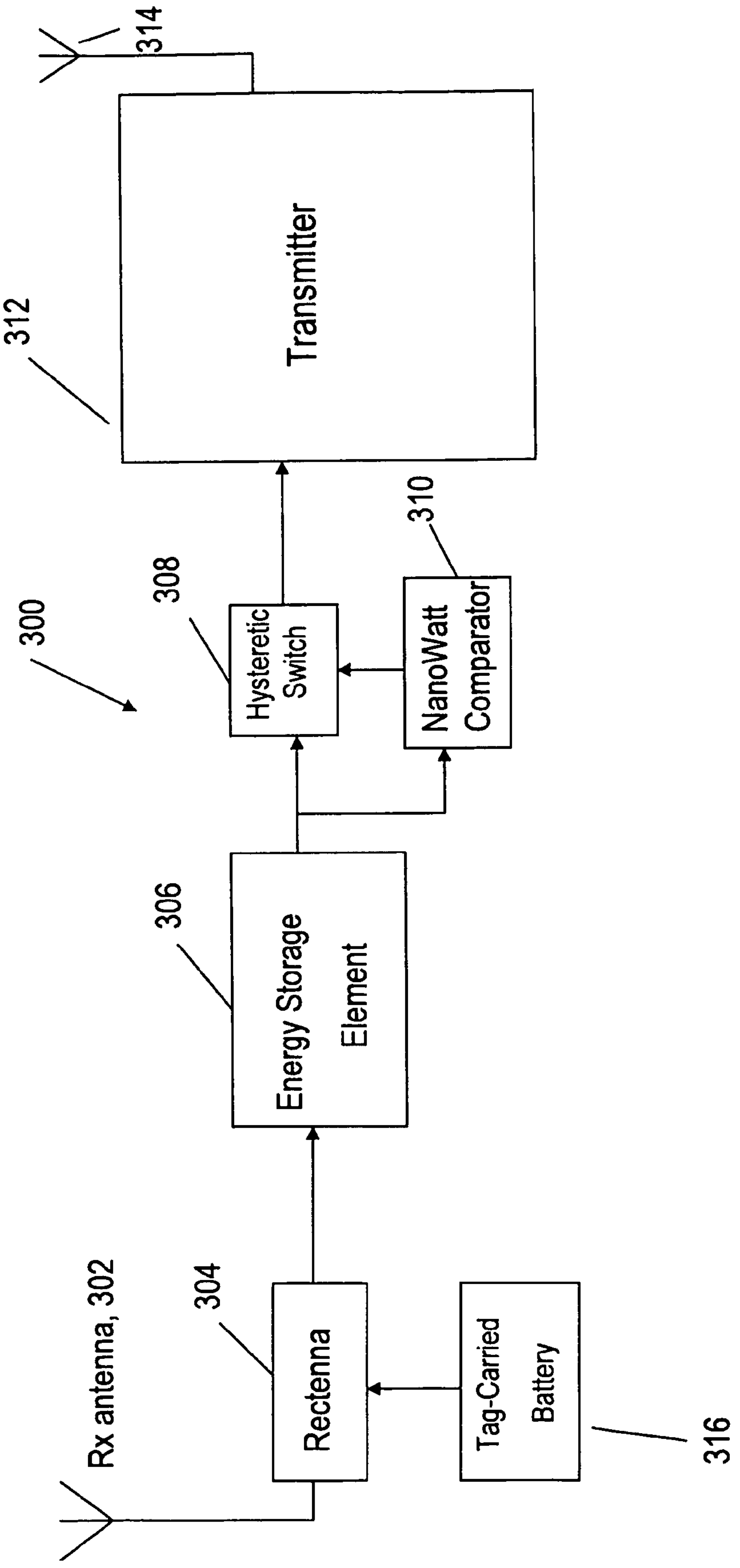

Referring now to FIG. 15, a regenerative tag 300 is shown to include a receive antenna 302, and a rectenna diode rectifier circuit 304 coupled to an energy storage element 308. The output from rectenna circuit 304 ranges between 50-400 millivolts which is stored on a 1-10 μF capacitor.

The output of energy storage element 306 is coupled to a hysteretic switch 308 which outputs 50-200 millivolts based on the output of a nanowatt comparator 310. This voltage is used to power transmitter 312 that is coupled to transmit antenna 314, which in one embodiment has a −26 dBm characteristic at 2 ghz.

In one embodiment, transmitter 312 is an oscillator that includes a LC circuit coupled to a tunnel diode oscillator which puts out 50-200 μW and which draws at approximately 65 millivolts at 1 milliamp.

As can be seen at 316, a tag-carried battery is coupled to rectenna circuit 304 to bias the diodes thereof with a nanoamp biasing voltage such as can be provided by a typical watch battery, or by lithium hydride thin film technology.

Hysteretic switch 308 is triggered on when the energy in energy storage element 306 exceeds a predetermined threshold such that transmitter 312 can be operated once the scavenged energy is sufficient for operation. When the hysteretic switch discharges, the transmitter emits the tag identification waveform. The computer contained in the tag reader contains a stored replica of this waveform. This replica is used for the correlation processing/cross ambiguity function processing method previously described. Ideally, the stored waveform is a baseband digital recording of a tag transmission created during tag initialization. Modern memory devices provide for several gigabytes of storage at inexpensive prices, making this feasible even for long-duration, wide bandwidth waveforms. Even when memory is limited, it is possible to reconstruct a long-time recording from a short sequence by remodulating the short sequence with the RFID code transmitted by the tag or by simply concatenating the unique segments of the tag waveform that constitute the periodic tag transmission. Through these means, the correlation processing algorithm obtains the processing gains necessary to detect the tag while minimizing the energy radiated by the tag, a limited quantity due to the need to remotely charge the tag using electromagnetic radiation from the interrogator.

It has been found that battery biasing the rectenna circuit improves the efficiency of the diode circuits in the rectenna to such an extent that the range of the regenerative tag is increased 10× over that associated with an unbiased rectenna circuit. This is because the scavenging ability of the multiple diode rectifier is significantly increased over an unbiased rectenna circuit.

It is therefore a finding of this invention that battery biasing a rectenna circuit results in both increased efficiency for the circuit and an order of magnitude increase in range for the tag.

It should be noted that the interrogator charges the tag through the input rectifier consisting of a lattice of diodes and capacitors. When the capacitor crosses a threshold voltage, the hysteretic switch discharges the capacitor into the oscillator circuit, thereby transmitting a signal. The energy stored into the tag in a given amount of time is inversely proportional to the square of the range to the tag.

In many cases, it is much easier to detect a tag emitting a waveform with total energy E0 than it is to charge a tag with the same amount of energy E0. Therefore, most of the engineering and design goes into figuring out efficient ways to charge the tag, because it is known that the range necessary to deposit energy E0 into the tag in a short period time is typically far shorter than the detectable range of the waveform. The performance of the tag depends on the amount of energy that can be charged, a quantity that is inversely proportional to the range to the tag.

Biasing the diodes in the rectifier circuit with a small voltage and a tiny amount of leakage current increases the rectification efficiency by a factor of 100. That is, one hundred times as much energy per time is deposited in the capacitor for a given power presented at the rectifier input. Since the efficiency is one hundred times greater and the input power is inversely proportional to the range squared, the effect is the same as increasing the range from the interrogator by a factor of ten.

In either case, the minimum detection range is far longer than the minimum tag charging range, so the minimum operating range goes up by a factor ten.

While the present invention has been described in connection with the preferred embodiments of the various figures, it is to be understood that other similar embodiments may be used or modifications or additions may be made to the described embodiment for performing the same function of the present invention without deviating therefrom.

Therefore, the present invention should not be limited to any single embodiment, but rather construed in breadth and scope in accordance with the recitation of the appended claims.

The invention claimed is:

1. A system for locating an item in an urban environment, comprising:

an RFID tag on an item which upon interrogation with an interrogation beam emits a coded signal indicative of the item back to a locator;

the locator having a data entry device;

a display on said locator;

a directional antenna carried by said locator;

a transmitter in said locator for projecting an interrogating beam using said directional antenna;

a receiver and processor for detecting modulated backscatter return from the tagged item and for indicating on said display the identification of the item detected; and, a computer for registering items, the code associated therewith and the name of the item in a computer listing, wherein said locator is configured to store said listing in said locator, whereby said data in said locator can be used to identify the item sought by its name such that only the item sought backscatters information back to the locator, and such that only the names of a selected item is displayed, and wherein the selection of an item results in an interrogation beam coded with the code associated with the selected item, whereby the range of said system is increased due to a reduction in the signal-to-noise ratio.

2. The system of claim 1, and further including a processor within said locator for displaying the name of the detected item upon detection of the item.

3. A system for locating an item in an urban environment, comprising:

an RFID tag on an item which upon interrogation with an interrogation beam emits a coded signal indicative of the item back to a locator;

the locator having a data entry device;

a display on said locator;

a directional antenna carried by said locator;

a transmitter in said locator for projecting an interrogating beam using said directional antenna;

a receiver and processor for detecting modulated backscatter return from the tagged item and for indicating on said display the identification of the item detected, wherein said display includes indicia indicating the position of the beam projected by said locator and an icon indicating the location of a detected item.

4. The system of claim 3, wherein said location includes range from said locator to said item.

5. The system of claim 4, wherein said range is derived from a cross ambiguity function.

6. The system of claim 4, wherein said beam is pulsed and said range is derived from range gating on the pulses projected by said locator.

7. A system for locating an item in an urban environment, comprising:

an RFID tag on an item which upon interrogation with an interrogation beam emits a coded signal indicative of the item back to a locator;

the locator having a data entry device;

a display on said locator;

a directional antenna carried by said locator;

a transmitter in said locator for projecting an interrogating beam using said directional antenna;

a receiver and processor for detecting modulated backscatter return from the tagged item and for indicating on said display the identification of the item detected, wherein said tag includes a receive antenna, a transmit antenna and a diode coupled between said antennas, and further including a battery to bias said diode, whereby the range of said system is increased over that associated with an unbiased diode.

8. The system of claim 7, wherein said range increase is at least a 50% increase over that associated with an unbiased diode.

* * * * *